UNITED STATES PATENT OFFICE 2,129,805

MANUFACTURE OF MORPHOLINE AND CERTAIN HOMOLOGUES THEREOF

Alexander L. Wilson, Pittsburgh, Pa., assignor, by mesne assignments, to Union Carbide and Carbon Corporation, a corporation of New York No Drawing. Application July 12, 1934, Serial No. 734,805

20 Claims. (Cl. 260—247)

This invention relates to the manufacture of morpholine and certain of its homologues, and of the intermediate hydrohalides of these compounds, and more particularly it concerns their production by a process involving the reacting together of the ββ'dihalogenated dialkyl ethers with ammonia, preferably in solution with water, or in solution in a suitable volatile solvent, such as methanol. The resultant reaction products subsequently may be reacted with a fixed alkali, as caustic soda, in aqueous solution. The morpholine present in this final reaction product may be recovered in a number of ways, as hereinafter indicated.

According to the invention, the reaction between the ββ'dihalogenated dialkyl ethers and the excess ammonia evidently produces morpholine hydrohalide, and treatment of the latter with caustic alkali converts it to morpholine. This may then be separated from the reaction mixture in suitable manner, as by extraction or distillation.

The following equations illustrate the type of reactions involved:

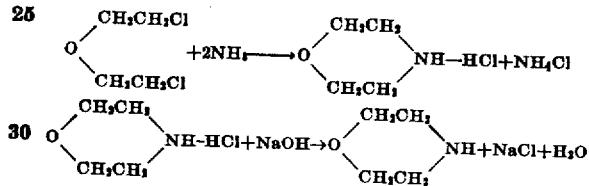

It has been discovered that the best yields of the intermediate product, morpholine hydrochloride, in accordance with the invention, are obtained when the ammonia is used in amounts substantially greater than 3 mols of ammonia per mol. of the dihalogenated ether, and preferably in amount at least twice the equivalent of the latter, thereby providing molar ratios of ammonia to the said ether of at least 4 to 1. These yields tend to increase with increase in the molar ratio of ammonia to ether; and molar ratios of from 5:1 to 20:1 are particularly efficacious for securing satisfactory yields of the intermediate product, morpholine hydrochloride.

In the prefered practice of my invention, a ββ'-dihalogenated dialkyl ether such as ββ'dichlordiethyl ether is reacted with an aqueous or an alcoholic solution of ammonia, the ammonia being in substantial excess of that required to react with the ether and form morpholine hydrochloride. The importance of this excess of ammonia has been indicated above.

During the reaction considerable exothermic heat develops, and additional heat may be supplied or removed to maintain the body of reactants at an elevated temperature, preferably between 60° and 90° C., although other temperatures both above and below this range may conveniently be used. Temperatures within the range from 50° to 60° C., and those higher than 90° C., have also proved satisfactory.

The time required for completion of the reaction varies with the nature of the reactants, and with the temperature and pressure used—the higher the temperatures or the higher the pressures, the shorter the time required. Pressures around 50 to 100 pounds per square inch gauge are quite suitable, but these may be widely departed from without interfering with the successful operation of the process. Agitation materially speeds the reaction. When conducting the reaction in a vertical tower adapted to be heated and cooled, the reaction rate is increased by maintaining a continuous turbulent flow of reactants from the bottom to the top of the tower by means of a pump.

After conversion of the ββ'dichlorodiethyl ether to the desired extent, the autoclave products consist of an aqueous (or alcoholic) solution of amine hydrochlorides, free ammonia, ammonium chloride, and possibly a little unreacted ether. Preferably this reaction mixture is concentrated by evaporation, is then partially neutralized with sodium hydroxide, and is again evaporated to remove combined ammonia and water. The residue is then treated with excess sodium hydroxide, and the mixture is refluxed until any dimorpholinium hydroxide is decomposed. The amines are then separated by gravity. In this manner it becomes unnecessary to separate the amines from water by distillation, which normally is difficult.

The above-mentioned autoclave products may be treated directly if desired, with an amount of caustic alkali solution or its equivalent in excess of that required to react with the morpholine hydrochloride to form morpholine. In place of a caustic alkali, one can employ various other materials such as alkali carbonates, lime, and higher boiling amines, such as morpholine vinyl ethyl ether.

Upon distillation of the alkali-treated autoclave reaction mixture, the liquid condensate contains morpholine, ammonia, the solvent used, and some of the higher amines. The still residue consists of excess caustic alkali solution, sodium chloride and residual amines. From this residue it is preferred to filter off the salt, decant or extract the amine layer, and recycle the alkali. Pure morpholine is obtained from the said liquid condensate by fractional distillation.

Morpholine also may be obtained from its hydrochloride by other methods. The dilute primary reaction mixture may be concentrated by distillation prior to the alkali treatment. Morpholine hydrochloride may be obtained, with or without admixture therewith of ammonium chloride and other amine hydrochlorides, by a process of concentration and fractional precipitation. Morpholine may be obtained from its hydrochloride, too, by treatment of an alcoholic solution of the latter with ammonia, and elimination of the more insoluble ammonium chloride.

It is within the scope of this invention to conduct the reaction between ammonia and ββ'dichlordiethyl ether in the presence of a solvent that does not itself react with the reactants, preferably a polar or ionizing solvent, and which is present in sufficient amount to reduce or control the violence of the exothermic reaction which first occurs. It is preferred to use for the purpose an inert solvent having a high absorption capacity for ammonia, such as methanol or ethanol.

In a specific example, submitted for purposes of illustration only; 95 parts by weight of ββ'dichlordiethyl ether were reacted in an autoclave for four hours with 107 parts by weight of ammonia in the form of a 28% aqueous solution. This gives a molar ratio of ammonia to the dichlordiethyl ether of 10 to 1. The reaction was conducted under 55 pounds per square inch gauge pressure, the temperature rising from 75° to 90° C. during the course thereof.

The autoclave product was then distilled to a boiling point of 120° C., thereby removing most of the excess ammonia and water. To this concentrated product was added 116 parts by weight of caustic soda in the form of a 25% aqueous solution, and the product was distilled to 124° C. The still residue was then allowed to separate, and was centrifuged to remove precipitated salt. The caustic layer was returned to the still, and upon boiling it to 128° C. a further amine layer was obtained. This was removed and treated in the manner previously indicated for recovery of the desired product.

In a somewhat similar example, the charge was continuously circulated through a tower while being maintained at a temperature of 70° to 75° C. by cooling as necessary. The pressure during the reaction dropped from 75 to 50 pounds per square inch gauge.

In accordance with another modification of the invention, an excess of anhydrous ammonia (more than twice the equivalent of the ether used), is absorbed in anhydrous methanol or other volatile solvent and reacted with ββ'dichlordiethyl ether in an autoclave, while heating the mixture to around 90° C. and upwards for several hours, under superatmospheric pressure. The clear liquid product is then stripped of excess ammonia; and methanol is distilled away. The remaining salty residue,—free of reactants and methanol,—is treated with an excess of aqueous caustic soda. The oily layer which separates is extracted with isopropyl ether or other solvent in the presence of excess caustic soda, and the resultant solution is fractionally distilled. The fraction boiling at 126° to 130° C. contains the morpholine.

In one instance wherein the last-named modification of the invention was utilized, 170 grams anhydrous ammonia (10 mols) were absorbed when an excess thereof was bubbled or flared in a stream through a mixture of 154 grams dichlordiethyl ether (somewhat over 1 mol.) and 2500 c.c. methanol (20 volumes), in an autoclave. The autoclave was gradually brought to a final temperature of 101° C. and to a maximum pressure of 88 pounds per square inch. After a reaction time of 3½ hours at 90° C. or higher, the autoclave was cooled, and the reaction liquid treated in the manner indicated above.

In this modification of the process the absence of water in the starting materials prevents hydrolysis of the ether to diglycol. Methanol is effectively employed as the solvent because of its high absorptive power for ammonia, a large excess of which is required. It also serves as an inert diluent for the reactants.

Morpholine does not readily separate from many of its water solutions. Consequently, substantial amounts of it are present in the aqueous distillates formed during certain distillation steps, and may be recovered therefrom by concentration, salting-out, extraction and distillation or by other equivalent steps.

For the purpose of securing increased yields of the latter by limiting or preventing undesirable side reactions, it has been found possible to carry out the reactions at low temperatures. In such instances the time required for the reaction is of course extended. In one instance where an average reaction temperature of 60° C. and a pressure of 30 pounds per square inch gauge was used, the reaction required sixty-nine hours for completion. The resultant reaction product was then distilled at 125° C. to a point where ammonium chloride precipitated, and this was removed by cooling and centrifuging the mixture. This simple elimination of ammonium chloride from the autoclave product, and a subsequent distillation of water from the amine salts at temperatures up to 130° C., prior to the caustic treatment, eliminated most of the water present. The concentrated reaction mixture was then treated with an excess of caustic soda in the form of a 25% aqueous solution. The amine layer which resulted was then extracted with solvent in the manner already described and the morpholine then recovered. The remaining caustic layer, after concentration to 50%, yielded a second amine layer which was similarly treated.

An important feature of my invention is the production of morpholine and certain homologues thereof from ββ'dihalogenated dialkyl ethers by a treatment thereof with aqueous ammonia. Heretofore the ammonia treatment of such ethers has produced only tertiary bases, apparently of the nature of dimorpholine diethyl ether:

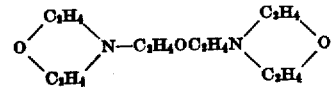

The process of the present invention offers a most economic way of producing morpholine and certain of its homologues, and it is employed at present for the manufacture of these products in substantial quantities.

The invention is not to be regarded as limited to the treatment of ββ'dichlordiethyl ether or of similarly halogenated products. On the contrary, such substances as ββ'dichlordiisopropyl ether yields dimethyl morpholine wherein one methyl apparently is attached to the 2 position, and the other methyl group apparently is attached at the 6 position. In certain instances the methyl groups possibly may be attached at the 3 and 5 positions, resulting from migration of these groups during the course of the reaction.

For example, 1110 parts by weight of ββ'-dichlor-di-isopropyl ether and 3890 parts by weight of aqueous 28% ammonia were heated in an autoclave for six days, with a total time of about 30 hours at a temperature of from 90° to 120° C. The reaction product was concentrated by distillation, and unreacted ether and ammonia were removed together with iron oxides. The residue was treated with a slight excess of sodium hydroxide and was evaporated, some of the resultant amines being carried into the aqueous distillate and some separating in the still as a supernatant layer over a residue of caustic and brine. Separation and distillation of the amines yielded a fraction boiling in the range of from 120° to 230° C. Fractional distillation thereof yielded a substantial fraction boiling at 145° to 150° C. at atmospheric pressure, identified as dimethyl morpholine. The latter is a colorless mobile liquid of strong ammoniacal odor closely resembling that of morpholine. It fumes when near moisture, and is soluble in water and miscible with ether. It is a base readily titrated to a methyl orange end point.

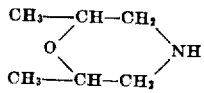

Although molar ratios of ammonia to ββ'-dihalognated ether of somewhat above 3 to 1 may be used, I have discovered that molar ratios very considerably higher than this are essential where satisfactory or commercial yields of morpholine are desired. Yields of morpholine in the neighborhood of 50% have been obtained using a molar ratio of ammonia to ββ'-dichlordiethyl ether of 9 to 1, whereas a much smaller yield is secured by the use of a 5:1 molar ratio.

The expression "a morpholine", and similar expressions mentioned in the specification and claims, are intended to designate morpholine, and alkyl derivatives or homologues of morpholine wherein at least one alkyl group or radical is attached to a ring carbon.

The expression "an aqueous solution" appearing in certain claims is intended to include solutions containing one or more suitable water-soluble volatile solvents in the presence of water.

The invention is susceptible of modification within the scope of the appended claims:

I claim:

1. The process of making a morpholine, which comprises heating and reacting under superatmospheric pressure a ββ'dichlorinated dialkyl ether with ammonia in a molar ratio of at least 5 of ammonia to 1 of the ether, reacting the resultant reaction mixture with an excess of a caustic alkali, and recovering the said morpholine thus produced.

2. Process as defined in claim 1, wherein the reaction between the said ether and ammonia is conducted in the presence of a solvent selected from the group consisting of water and the lower monohydric alcohols.

3. Process as defined in claim 1, wherein ββ'-dichlorinated diethyl ether is reacted with the ammonia.

4. The process of making a morpholine, which comprises heating and reacting under superatmospheric pressure a ββ'dichlorinated dialkyl ether with ammonia in a molar ratio of at least 9 of ammonia to 1 of the ether, and thereafter liberating the said morpholine from the resultant reaction mixture.

5. Process as defined in claim 4, wherein the reaction between the said ether and ammonia is conducted in the presence of a solvent selected from the group consisting of water and the lower monohydric alcohols.

6. Process as defined in claim 4, wherein ββ'-dichlordiethyl ether is reacted with ammonia.

7. Process as defined in claim 4, wherein ββ'-dichlordiisopropyl ether is reacted with ammonia.

8. The process of making a morpholine, which comprises heating and reacting under superatmospheric pressure a ββ'dichlorinated dialkyl ether with anhydrous ammonia in a molar ratio of at least 9 of ammonia to 1 of the ether, in the presence of an anhydrous volatile solvent, converting the resultant hydrochloride of a morpholine to the corresponding free morpholine, and recovering the latter.

9. The process of producing a morpholine, which comprises heating and reacting under superatmospheric pressure a ββ'dichlorinated dialkyl ether with ammonia in a molar ratio of at least 9 of ammonia to 1 of the ether, in the presence of water, reacting the resultant mixture with an excess of a caustic alkali to convert the hydrochloride of a morpholine therein to the corresponding morpholine, and recovering the latter.

10. Process as defined in claim 9, wherein the ether employed is selected from the group consisting of ββ'dichlordiethyl ether and ββ'dichlordiisopropyl ether.

11. In the process of producing a morpholine, the step which comprises reacting at superatmospheric pressure and at an elevated temperature a ββ'dichlorinated dialkyl ether with ammonia in a molar ratio of between around 9 and around 20 mols of ammonia to 1 mol. of the said ether.

12. In the process of producing a morpholine, the step which comprises reacting at superatmospheric pressure and at an elevated temperature a ββ'dichlorinated dialkyl ether with ammonia in a molar ratio of between around 9 and around 20 mols of ammonia to 1 mol. of the said ether, in the presence of a solvent selected from the group consisting of water and the lower monohydric alcohols.

13. In the process of producing a morpholine, the step which comprises reacting a ββ'dichlordialkyl ether with ammonia in a molar ratio of between around 9 and around 20 mols of ammonia to 1 mol. of the said ether, at a temperature within the range from around 50° to around 120° C., and under superatmospheric pressure.

14. The process of making a morpholine, which comprises introducing a stream of ammonia into a solution of a ββ'dichlorinated dialkyl ether in a volatile solvent which is inert to the reactants, while heating and reacting the said ether with ammonia in a molar ratio of at least 5 mols of ammonia to 1 of the ether, and thereafter liberating and recovering from the reaction mixture the said morpholine thus produced.

15. The process as defined in claim 14, wherein ββ'dichlordiethyl ether is reacted with ammonia, and wherein morpholine is recovered.

16. The process of producing a morpholine, which comprises heating and reacting a ββ'dichlorinated dialkyl ether with ammonia in the molar ratio of more than 5 of ammonia to 1 of the ether, in the presence of an aqueous solution, distilling water and excess ammonia from the resultant product, and reacting the thus concentrated mixture with an excess of a caustic alkali over that required for chemical interaction with the said product, and recovering the said morpholine thus produced.

17. The process of producing a morpholine, which comprises heating and reacting a ββ'-dichlorinated dialkyl ether with ammonia in aqueous solution, the said ammonia and ether being present in a molar ratio of at least 5 to 1, distilling the resultant reaction mixture to remove excess ammonia and water, treating the residue with an excess of caustic alkali in dilute aqueous solution, thereby forming an amine layer and a caustic layer, extracting the former with a volatile solvent for morpholine, and recovering the said morpholine from the resultant solution.

18. The process of making a morpholine, which comprises introducing a flowing stream of anhydrous ammonia into a solution of a ββ'-dichlorinated dialkyl ether in an anhydrous volatile solvent which is inert to the reactants, while heating and reacting under superatmospheric pressure the said ether with ammonia in a molar ratio of at least 9 mols of ammonia to 1 of the ether, and thereafter liberating and recovering from the reaction mixture the said morpholine.

19. The process of producing morpholine, which comprises heating and reacting ββ'-dichlordiethyl ether under superatmospheric pressure with ammonia, the ammonia and the said ether being present in a molar ratio of at least 9 to 1 respectively, in the presence of an aqueous solution, removing excess ammonia and water from the resultant reaction mixture at a temperature not substantially above 120° C. thereby concentrating the mixture, treating the concentrated mixture with an excess of caustic alkali, thereby converting the morpholine hydrochloride therein to morpholine, and recovering the latter.

20. The process of producing a morpholine, which comprises heating and reacting a ββ'-dichlorinated dialkyl ether with an ammonia solution in an aqueous low-boiling inert solvent having high absorptive powers for ammonia, the said ammonia and ether being present respectively in a molar ratio of at least 9 to 1, distilling the resulting reaction mixture thereby removing excess ammonia, solvent and water, treating the residue with an excess of caustic alkali, and recovering the said morpholine thus produced.

ALEXANDER L. WILSON.

CERTIFICATE OF CORRECTION.

Patent No. 2,129,805. September 13, 1938.

ALEXANDER L. WILSON.

It is hereby certified that error appears in the printed specification of the above numbered patent requiring correction as follows: Page 2, first column, line 75, for "flared" read flowed; page 3, first column, line 4, for "chlor-di-isopropyl" read chlordiisopropyl; and line 32, for "halognated" read halogenated; and that the said Letters Patent should be read with this correction therein that the same may conform to the record of the case in the Patent Office.

Signed and sealed this 15th day of November, A. D. 1938.

Henry Van Arsdale (Seal)

Acting Commissioner of Patents.

17. The process of producing a morpholine, which comprises heating and reacting a ββ'-dichlorinated dialkyl ether with ammonia in aqueous solution, the said ammonia and ether being present in a molar ratio of at least 5 to 1, distilling the resultant reaction mixture to remove excess ammonia and water, treating the residue with an excess of caustic alkali in dilute aqueous solution, thereby forming an amine layer and a caustic layer, extracting the former with a volatile solvent for morpholine, and recovering the said morpholine from the resultant solution.

18. The process of making a morpholine, which comprises introducing a flowing stream of anhydrous ammonia into a solution of a ββ'-dichlorinated dialkyl ether in an anhydrous volatile solvent which is inert to the reactants, while heating and reacting under superatmospheric pressure the said ether with ammonia in a molar ratio of at least 9 mols of ammonia to 1 of the ether, and thereafter liberating and recovering from the reaction mixture the said morpholine.

ture with an excess of a caustic alkali over that required for chemical interaction with the said product, and recovering the said morpholine thus produced.

19. The process of producing morpholine, which comprises heating and reacting ββ'-dichlordiethyl ether under superatmospheric pressure with ammonia, the ammonia and the said ether being present in a molar ratio of at least 9 to 1 respectively, in the presence of an aqueous solution, removing excess ammonia and water from the resultant reaction mixture at a temperature not substantially above 120° C. thereby concentrating the mixture, treating the concentrated mixture with an excess of caustic alkali, thereby converting the morpholine hydrochloride therein to morpholine, and recovering the latter.

20. The process of producing a morpholine, which comprises heating and reacting a ββ'-dichlorinated dialkyl ether with an ammonia solution in an aqueous low-boiling inert solvent having high absorptive powers for ammonia, the said ammonia and ether being present respectively in a molar ratio of at least 9 to 1, distilling the resulting reaction mixture thereby removing excess ammonia, solvent and water, treating the residue with an excess of caustic alkali, and recovering the said morpholine thus produced.

ALEXANDER L. WILSON.

CERTIFICATE OF CORRECTION.

Patent No. 2,129,805.　　September 13, 1938.

ALEXANDER L. WILSON.

It is hereby certified that error appears in the printed specification of the above numbered patent requiring correction as follows: Page 2, first column, line 75, for "flared" read flowed; page 3, first column, line 4, for "chlor-di-isopropyl" read chlordiisopropyl; and line 32, for "halognated" read halogenated; and that the said Letters Patent should be read with this correction therein that the same may conform to the record of the case in the Patent Office.

Signed and sealed this 15th day of November, A. D. 1938.

Henry Van Arsdale (Seal)　　Acting Commissioner of Patents.